United States Patent
Lu

(10) Patent No.: US 9,354,247 B2
(45) Date of Patent: May 31, 2016

(54) METHOD FOR CALIBRATING A ROTATION RATE SENSOR, AND ELECTRICAL DEVICE

(71) Applicant: Robert Bosch GmbH, Stuttgart (DE)

(72) Inventor: Ye Lu, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/724,488

(22) Filed: May 28, 2015

(65) Prior Publication Data

US 2015/0355225 A1 Dec. 10, 2015

(30) Foreign Application Priority Data

Jun. 5, 2014 (DE) .......................... 10 2014 210 739

(51) Int. Cl.
| | | |
|---|---|---|
| *H04N 17/00* | (2006.01) | |
| *H04N 17/02* | (2006.01) | |
| *G01P 21/00* | (2006.01) | |
| *G01C 25/00* | (2006.01) | |
| *G06T 7/00* | (2006.01) | |

(52) U.S. Cl.
CPC .............. *G01P 21/00* (2013.01); *G01C 25/005* (2013.01); *G06T 7/0018* (2013.01); *H04N 17/002* (2013.01)

(58) Field of Classification Search
USPC ............. 348/175, 158, 141, 113, 107, 74, 49, 348/208.1, 211.14, 222.1, 231.9, 231.6, 348/231.99, 231.1, 231.3, 236, 264, 340, 348/374, 376, 425.1, 583, 721, 813, 838; 700/64, 176, 243, 251, 254; 701/28, 701/33.1; 702/85, 145
See application file for complete search history.

(56) References Cited

U.S. PATENT DOCUMENTS

| | | | | |
|---|---|---|---|---|
| 8,164,655 | B2 * | 4/2012 | Lablans ................ | H04N 5/775 348/143 |
| 8,786,671 | B2 * | 7/2014 | Shih ...................... | H04N 5/772 348/143 |
| 9,013,617 | B2 * | 4/2015 | Ramachandran ...... | G01C 25/00 348/208.1 |
| 2002/0183962 | A1 * | 12/2002 | Glaser .................. | B60R 21/013 702/151 |
| 2007/0098279 | A1 * | 5/2007 | Hahn .................... | G06T 7/0022 382/238 |
| 2008/0120056 | A1 | 5/2008 | Haino et al. | |
| 2008/0249732 | A1 | 10/2008 | Lee et al. | |
| 2009/0190846 | A1 * | 7/2009 | Mevissen ............. | G06T 3/0012 382/236 |
| 2010/0134593 | A1 * | 6/2010 | Kakinami ................ | B60R 1/00 348/43 |
| 2011/0128138 | A1 * | 6/2011 | Yamamoto ........ | B60W 30/0956 340/436 |
| 2012/0149432 | A1 * | 6/2012 | Lablans ................ | H04N 5/775 455/556.1 |
| 2012/0176491 | A1 | 7/2012 | Garin et al. | |
| 2012/0176492 | A1 | 7/2012 | Garin | |
| 2013/0231825 | A1 | 9/2013 | Chundrlik, Jr. et al. | |
| 2014/0104445 | A1 | 4/2014 | Ramachandran et al. | |

* cited by examiner

*Primary Examiner* — Jefferey Harold
*Assistant Examiner* — Mustafizur Rahman
(74) *Attorney, Agent, or Firm* — Norton Rose Fulbright US LLP

(57) ABSTRACT

In a method for calibrating a rotation rate sensor which is part of an electrical device also including an image recorder, an image processor, and a calibration unit, the image recorder generates in a first method step a first image data signal as a function of a first image recording and generates a second image data signal as a function of a second image recording; the rotation rate sensor generates a rotation rate data signal including rotation rate data with regard to a time interval between the first and the second image recording; the image processor generates an orientation change signal in a second method step as a function of the first and second image data signals; and the rotation rate sensor is calibrated by the calibration unit in a fourth method step as a function of the orientation change signal and the rotation rate data signal.

10 Claims, 3 Drawing Sheets

METHOD FOR CALIBRATING A ROTATION RATE SENSOR, AND ELECTRICAL DEVICE

BACKGROUND OF THE INVENTION

1. Field of the Invention

The present invention relates to a method for calibrating a rotation rate sensor.

2. Description of the Related Art

Methods for calibrating rotation rate sensors are generally known. Typically, the rotation rate sensor is calibrated by correcting a systematic deviation (offset signal) of an output signal of the rotation rate sensor, using acceleration sensors and/or magnetic field sensors, for example. However, a disadvantage of the known methods is that if the offset signal changes over time (due to external interferences, for example), such a calibration is comparatively prone to error or complicated. This is the case, for example, when the rotation rate sensor is integrated into a system which is continuously moved or exposed to temperature fluctuations which occur comparatively frequently. In addition, recognizing a quiescent state for the calibration is often relatively unreliable or not possible at all.

BRIEF SUMMARY OF THE INVENTION

The object of the present invention is to provide a method for calibrating a rotation rate sensor which, compared to the related art, allows comparatively rapid and reliable calibration, and in addition is preferably independent of time-dependent interferences.

The method according to the present invention for calibrating a rotation rate sensor, and the electrical device according to the present invention according to the other independent claim, have the advantage over the related art that the calibration is carried out relatively independently of external interferences, such as magnetic interferences or rotary motions of the electrical device, so that the electrical device is more reliably usable in a number of different applications. In addition, it is advantageously possible according to the present invention to dispense with the use of further components such as acceleration sensors and/or magnetic field sensors for the calibration, so that the calibration is independent of the measuring accuracy of these sensors. An image evaluation is preferably used according to the present invention for calibrating the rotation rate sensor, so that in particular the orientation change information is determined by the image evaluation. The image recording device, preferably a camera, of the electrical device is used, the rotation rate sensor and the image recording means, for example, being fixedly connected to one another and/or integrated into the electrical device. The image recording means is activated in particular prior to or during the calibration (i.e., prior to the first method step). The first and/or second image recording(s) is/are preferably evaluated in real time with the aid of image evaluation (i.e., within a few seconds or milliseconds after the first and/or second image recording), the result of the image evaluation being compared in particular to the rotation rate data or to some other evaluation result of the rotation rate data. The image evaluation allows relatively quick calibration of the rotation rate sensor, whereby the electrical device does not have to be in a neutral position. According to the present invention, it is preferred that, prior to carrying out the fourth method step, it is detected as a function of the first and second image recordings that the first and second image recordings indicate a quiescent state (i.e., no motion or rotation of the image recording means), or that first and second image recordings indicate a change in orientation of the image recording means. It is thus advantageously possible to effectively and reliably recognize a quiescent state (of the electrical device) and to carry out the method in a relatively flexible manner, even when the electrical device is in motion, and/or to carry out the method relatively independently of other sensors and/or external interferences (magnetic interferences, for example). The designation of the first, second, third, and fourth method steps refers in particular to a temporal sequence of the method steps, or to any (temporal) logical sequence of the method steps.

According to one preferred refinement, it is provided that in the second method step, the orientation change signal is generated by the image processing means in an image processing step in such a way that the orientation change signal includes orientation change information with regard to a change in orientation of the electrical device between the first and the second image recording.

It is thus advantageously possible to use the orientation change information to detect a change in orientation, in particular a rotation, of the electrical device. For example, the orientation change information is generated with the aid of photogrammetry in the image processing step.

According to another preferred refinement, it is provided that a rotation detection step is carried out in a third method step, it being detected in the rotation detection step, as a function of the orientation change signal, whether the electrical device has been rotated between the first and the second image recording.

It is thus advantageously possible for the calibration of the rotation rate sensor to be carried out as a function of a detection of a change in orientation of the electrical device, whereby, for example, for a detection of a neutral position of the electrical device, a calibration method which may be carried out more easily and/or more quickly is selected than for a detection of a motion of the electrical device (i.e., the electrical device is not in a neutral position).

According to another preferred refinement, it is provided that an offset compensation signal for calibrating the rotation rate sensor is generated in the fourth method step solely by using rotation rate data of the rotation rate data signal when the orientation change information indicates a quiescent state of the electrical device between the first and the second image recording, the offset compensation signal being generated in particular by averaging of the rotation rate data of the rotation rate data signal.

It is thus advantageously possible for the calibration to be carried out comparatively quickly and efficiently when a quiescent state is recognized in a way that is adapted to the quiescent state.

According to another preferred refinement, it is provided that the offset compensation signal for calibrating the rotation rate sensor is generated in the fourth method step as a function of the rotation rate data of the rotation rate data signal and as a function of a further orientation change signal when the orientation change information of the orientation change signal indicates a rotation of the electrical device between the first and the second image recording.

It is thus advantageously possible for a reliable calibration of the rotation rate sensor to be achieved, even when the electrical device is moved during the calibration.

According to another preferred refinement, it is provided that the further orientation change signal is generated by the image processing means in a further image processing step as a function of the first and second image data signals.

It is thus advantageously possible for the image processing step for generating the orientation change signal to be carried out in a comparatively easy and time-efficient manner compared to the further image processing step for generating the further orientation change signal, the further image processing step preferably being carried out only when a change in orientation (i.e., a motion) of the electrical device has been detected beforehand, and in particular not being carried out if a neutral position of the electrical device has been detected beforehand.

According to another preferred refinement, it is provided that first orientation change coordinates are ascertained as a function of the rotation rate data signal, second orientation change coordinates being generated as a function of the first and second image data signals, the calibration means generating the offset compensation signal as a function of the first and second orientation change coordinates, the offset compensation signal being generated in particular by comparing the first and second orientation change coordinates.

It is thus advantageously possible that, using first orientation change coordinates generated as a function of the rotation rate data of the rotation rate sensor (by integration, for example) and second orientation change coordinates generated as a function of the first and second image data of the image recording means (by the further image processing step, for example), a comparatively reliable calibration of the rotation rate sensor is achieved, regardless of external interferences such as magnetic fields, even when the rotation rate sensor is in motion. A new calibration is preferably possible even during operation of the electrical device, since the rotation rate sensor and the image recording means (the camera, for example) are used for the calibration.

According to another preferred refinement, it is provided that the second orientation change coordinates are generated by the image processing means in the image processing step or in the further image processing step.

It is thus advantageously possible for the second orientation change coordinates to be generated in the further image processing step when rotation detection takes place, or alternatively, for the second orientation change coordinates to be generated in the image processing step when rotation detection is omitted.

According to one preferred refinement, in particular of the electrical device, it is provided that the electrical device is configured for ascertaining first orientation change coordinates as a function of the rotation rate data signal, the electrical device being configured for ascertaining second orientation change coordinates as a function of the first and second image data signals, the calibration means being configured for generating the offset compensation signal as a function of the first and second orientation change coordinates.

It is thus advantageously possible for an electrical device to be provided for a comparatively rapid and reliable calibration, in which a calibration of the rotation rate sensor is achieved independently of time-dependent interferences.

Exemplary embodiments of the present invention are illustrated in the drawing and explained in greater detail in the following description.

DETAILED DESCRIPTION OF THE INVENTION

Figure 1:
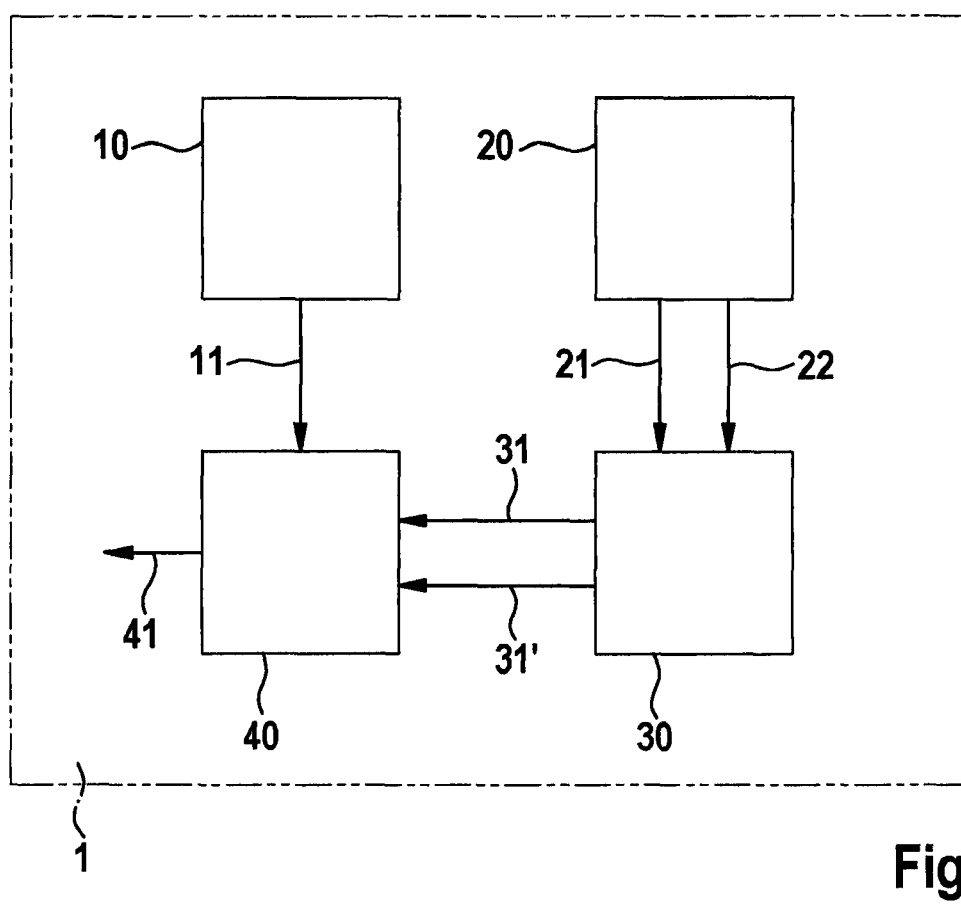
FIG. 1 shows an electrical device according to one specific embodiment of the present invention.

Identical parts are always provided with the same reference numerals in the various figures, and therefore are generally designated or mentioned only once in each case.

An electrical device 1 according to one specific embodiment of the present invention is illustrated in a schematic view in FIG. 1. According to the present invention, electrical device 1 is preferably a portable electrical device or a mobile electrical device 1. Device 1 is, for example, a mobile telecommunication terminal, a navigation device, a position determination device, or some other electrical device 1. Electrical device 1 includes a rotation rate sensor 10, an image recording means 20, an image processing means 30, and a calibration means 40.

Rotation rate sensor 10 is a microelectromechanical rotation rate sensor, for example (i.e., a rotation rate sensor of a microelectromechanical system (MEMS)). Rotation rate sensor 10 is configured for generating rotation rate data, for example one or multiple pieces of rotational speed data, with regard to a rotary motion of rotation rate sensor 10.

Image recording means 20 is preferably integrated together with rotation rate sensor 10 into electrical device 1. For example, image recording means 20 is a digital camera. Image recording means 20 is configured for sequential image recording (i.e., a first and second image recording), the second image recording being carried out in particular as early as possible or essentially immediately after a predetermined time interval after the first image recording elapses. Image recording means 20 is configured for generating a first image data signal 21 as a function of the first image recording, and a second image data signal 22 as a function of the second image recording. In particular, the first and second image data are transmitted from image recording means 20 to image processing means 30.

Electrical device 1 is also configured in such a way that the rotation rate data of rotation rate data signal 11 relate to the predetermined time interval between the first and second image recording. The rotation rate data of rotation rate sensor 10 are preferably stored in a memory means of electrical device 1. Rotation rate sensor 10 is preferably operated at a higher sampling rate than image recording means 20, so that rotation rate data are detected between the first and the second image recording at two or more different points in time.

Image processing means 30 is configured for generating an orientation change signal 31 as a function of first and second image data signals 21, 22. Image processing means 30 is preferably configured for generating a further orientation change signal 31' as a function of first and second image data signals 21, 22, in particular orientation change signal 31 being generated in an image processing step, and further orientation change signal 31' being generated in a further image processing step. Calibration means 40 is configured for calibrating rotation rate sensor 10 as a function of orientation change signal 31 and as a function of rotation rate data signal 11.

In the image processing step a first (significant) point is extracted, preferably as a function of the first image data, and is associated with a corresponding second (significant) point with regard to the second image data (by feature recognition, for example). A pixel coordinate change value (orientation change information) of at least one pixel which is linked to the first and second points (by photogrammetry) is subsequently computed. For example, a difference between a coordinate of the first and of the second point is computed. Based on a comparison of the pixel coordinate change value to a predetermined threshold value, a rotation detection is carried out, it being established, for example, that no rotation of electrical device 1 has taken place between the first and the second image recording when the pixel coordinate change value is below the predetermined threshold value.

In particular in the case that the orientation change information indicates a quiescent state of electrical device 1 between the first and the second image recording, an offset compensation signal 41 for calibrating rotation rate sensor 10 is generated solely by using rotation rate data of rotation rate data signal 11, offset compensation signal 41 being generated in multiple steps, of which one step in particular includes carrying out averaging of the rotation rate data of rotation rate data signal 11. Alternatively, in the case that the orientation change information of orientation change signal 31 indicates a rotation of the electrical device between the first and the second image recording, offset compensation signal 41 for calibrating rotation rate sensor 10 is generated as a function of the rotation rate data of rotation rate data signal 11 and as a function of a further orientation change signal 31'. This means in particular that first orientation change coordinates are generated as a function of rotation rate data signal 11, and a further image evaluation is carried out, the relative change in orientation of image recording means 20 (i.e., the camera) between the first and the second image recording being determined with the aid of the principle of epipolar geometry (see FIG. 3), in particular second orientation change coordinates being determined. After the second orientation coordinates have been ascertained by the further image evaluation, offset compensation signal 41 is determined by calibration means 40, preferably as a function of the first and second orientation change coordinates (by a comparison). According to the present invention, rotation rate sensor 10 is particularly preferably calibrated based on the use of quaternions.

Figure 2:
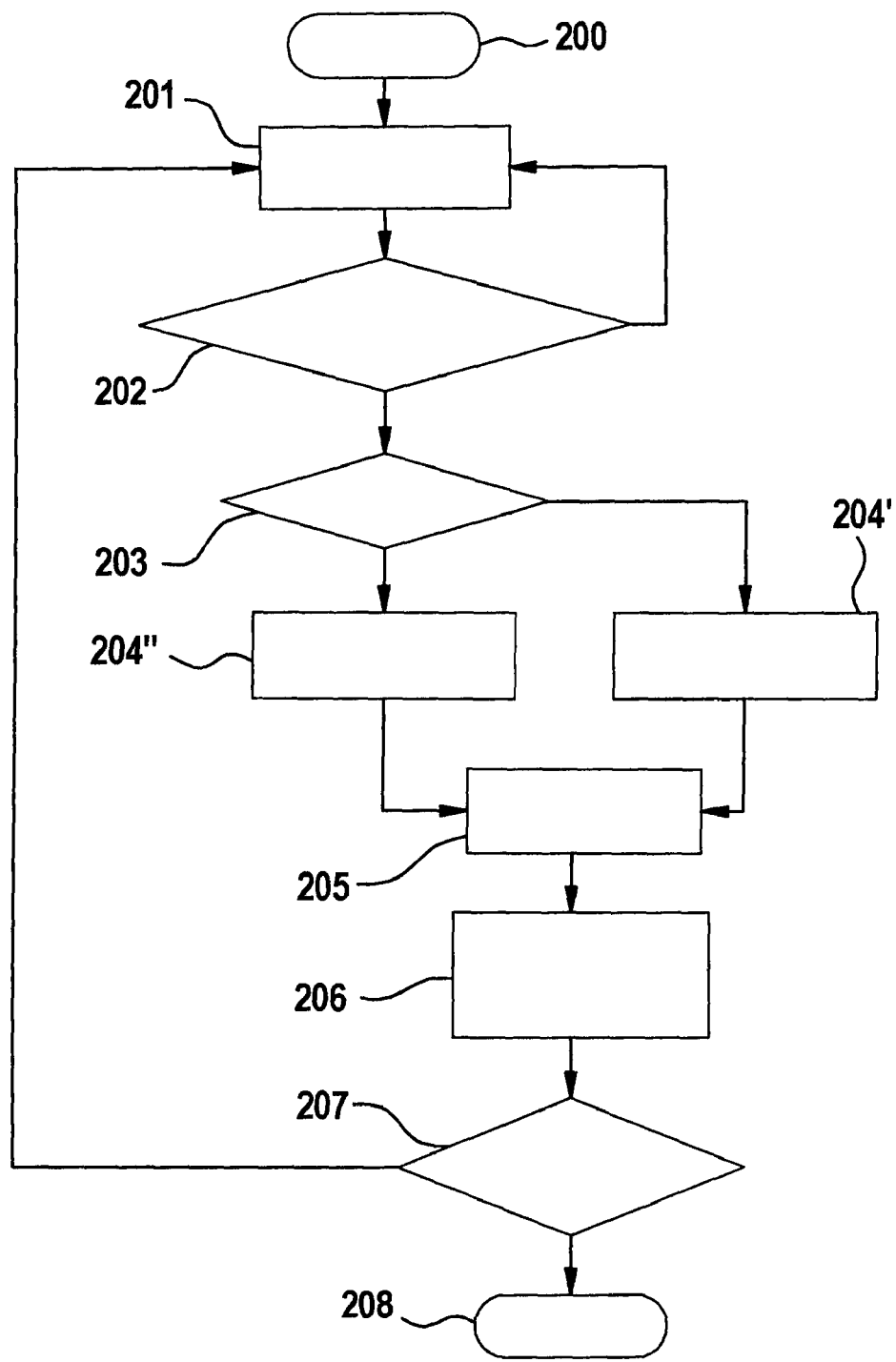
FIG. 2 shows a method according to one specific embodiment of the present invention.

A method according to one specific embodiment of the present invention is illustrated in a schematic view as a flow chart in FIG. 2. The start of the method is denoted by reference numeral 200. The state vector is computed in a first calibration step 201, the first and second image recordings being carried out within the predetermined time interval, and the rotation rate detection being carried out. A check is made in a second calibration step 202 as to whether an image evaluation (i.e., the image processing step) has been carried out, first calibration step 201 in particular being repeated until the check of second calibration step 202 is positive. If it is established in second calibration step 202 that an image evaluation has taken place, a rotation detection step 203 is carried out in a third calibration step 303. In a first case, a fourth calibration step is carried out (see reference numeral 204') when it is detected in rotation detection step 203 that electrical device 1 was not rotated during the predetermined time interval, offset correction information being determined in fourth calibration step 204' based on averaging of the rotation rate data. In a second case, an alternative fourth calibration step is carried out (see reference numeral 204") when it is detected in rotation detection step 203 that electrical device 1 has rotated during the predetermined time interval, the offset correction information being generated as a function of the rotation rate data of rotation rate data signal 11 and as a function of further orientation change signal 31'. Offset compensation information is updated in a fifth calibration step 205 as a function of the offset correction information. Calibration parameters (quaternions and/or indices, for example) are reset to a starting value in a sixth calibration step 206. A check is made in a seventh calibration step 207 whether the calibration should be continued, first calibration step 201 being carried out when the result is positive, and the method being terminated (see reference numeral 208) when the result is negative. Offset compensation signal 41 for compensating for an offset signal of the output signal of the rotation rate sensor is preferably generated as a function of the offset compensation information.

Figure 3:
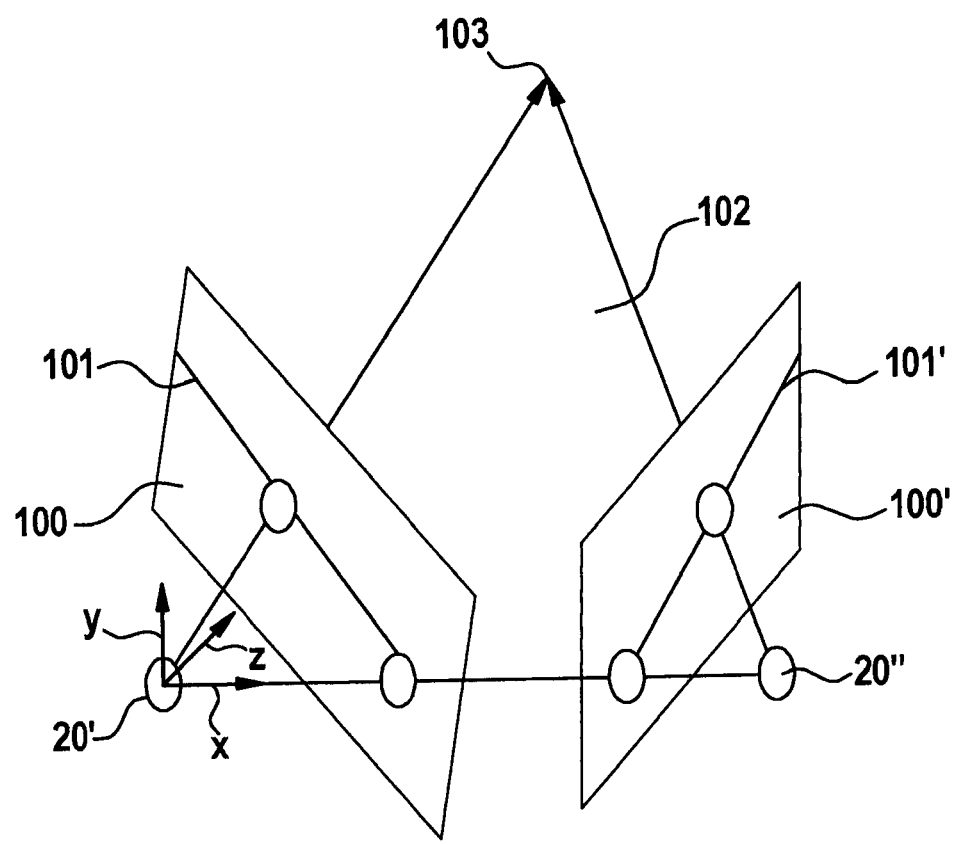
FIG. 3 shows a depiction of the epipolar geometry.

A depiction of the epipolar geometry is illustrated in FIG. 3. Determining the relative orientation of image recording means 20 between the first and the second image recording takes place, for example, by stereo image analysis, in particular based on the epipolar geometry. FIG. 3 illustrates a first orientation of image recording means 20 during the first image recording (see reference numeral 20'), and a second orientation of image recording means 20 during the second image recording (see reference numeral 20"). FIG. 3 also shows a first image plane 100 having a first epipolar line 101 with regard to the first image recording, and a second image plane 100' having a second epipolar line 101' with regard to the second image recording. Reference numeral 103 denotes the observation point. The epipolar plane is denoted by reference numeral 102.

What is claimed is:

1. A method for calibrating a rotation rate sensor which is part of an electrical device further including an image recording unit, an image processing unit, and a calibration unit, the method comprising:
   generating, by the image recording unit in a first step, a first image data signal as a function of a first image recording and a second image data signal as a function of a second image recording;
   generating, by the image processing unit in a second method step, an orientation change signal as a function of the first and second image data signals;
   generating, by the rotation rate sensor in a third method step, a rotation rate data signal including rotation rate data with regard to a time interval between the first and second image recordings;
   calibrating, by the calibration unit in a fourth method step, the rotation rate sensor as a function of the orientation change signal and as a function of the rotation rate data signal.

2. The method as recited in claim 1, wherein in the second method step, the orientation change signal is generated by the image processing unit in an image processing substep in such a way that the orientation change signal includes orientation change information with regard to a change in orientation of the electrical device between the first and second image recordings.

3. The method as recited in claim 2, wherein a rotation detection is carried out in the third method step to detect, as a function of the orientation change signal, whether the electrical device has been rotated between the first and second image recordings.

4. The method as recited in claim 1, wherein an offset compensation signal for calibrating the rotation rate sensor is generated in the fourth method step solely by using rotation rate data of the rotation rate data signal when the orientation change information indicates a quiescent state of the electrical device between the first and second image recordings, the offset compensation signal being generated by averaging of the rotation rate data of the rotation rate data signal.

5. The method as recited in claim 1, wherein the offset compensation signal for calibrating the rotation rate sensor is generated in the fourth method step as a function of the rotation rate data of the rotation rate data signal and as a function of a further orientation change signal when the orientation change information of the orientation change signal indicates a rotation of the electrical device between the first and second image recordings.

6. The method as recited in claim 5, wherein the further orientation change signal is generated by the image processing unit in a further image processing substep as a function of the first and second image data signals.

7. The method as recited in claim 5, wherein first orientation change coordinates are ascertained as a function of the rotation rate data signal, second orientation change coordinates being generated as a function of the first and second image data signals, and the calibration unit generates the offset compensation signal as a function of the first and second orientation change coordinates, the offset compensation signal being generated by comparing the first and second orientation change coordinates.

8. The method as recited in claim 7, wherein the second orientation change coordinates are generated by the image processing unit in the image processing substep or in the further image processing substep.

9. An electrical device, comprising:
a rotation rate sensor;
an image recording unit;
an image processing unit; and
a calibration unit;
wherein:
the image recording unit is configured for sequential image recording, the image recording unit generating a first image data signal as a function of a first image recording and a second image data signal as a function of a second image recording;
the rotation rate sensor being configured for generating rotation rate data signal including rotation rate data with regard to a time interval between the first and second image recordings;
the image processing unit is configured for generating an orientation change signal as a function of the first and second image data signals; and
the calibration unit is configured for calibrating the rotation rate sensor as a function of the orientation change signal and as a function of the rotation rate data signal.

10. The electrical device as recited in claim 9, wherein:
the electrical device is configured to (i) ascertain first orientation change coordinates as a function of the rotation rate data signal, and (ii) ascertain second orientation change coordinates as a function of the first and second image data signals; and
the calibration unit is configured to generate an offset compensation signal as a function of the first and second orientation change coordinates.

\* \* \* \* \*